No. 898,003. PATENTED SEPT. 8, 1908.
E. POSSON.
NUT LOCK.
APPLICATION FILED JULY 5, 1906.
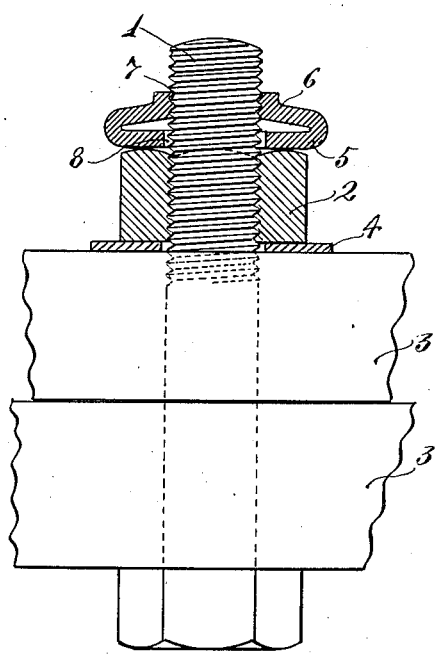
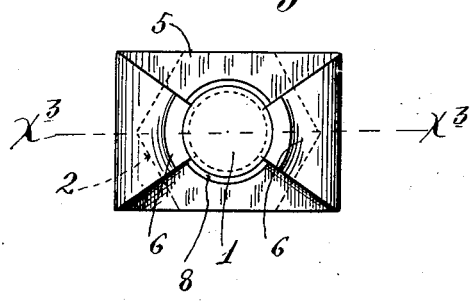
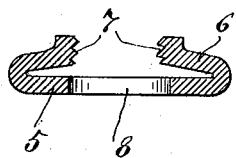
Witnesses.
A. H. Opsahl.
E. W. Jeppesen,
Inventor.
Edward Posson.
By his Attorneys.
Williamson Merchant

UNITED STATES PATENT OFFICE.

EDWARD POSSON, OF CHICAGO, ILLINOIS.

NUT-LOCK.

No. 898,003.      Specification of Letters Patent.      Patented Sept. 8, 1908.

Application filed July 5, 1906. Serial No. 324,913.

*To all whom it may concern:*

Be it known that I, EDWARD POSSON, citizen of the United States, residing at Chicago, in the county of Cook and State of Illinois, have invented certain new and useful Improvements in Nut-Locks; and I do hereby declare the following to be a full, clear, and exact description of the invention, such as will enable others skilled in the art to which it appertains to make and use the same.

My invention has for its object to provide a simple, cheap and efficient nut lock, and to this end it consists of the novel construction and combination of parts hereinafter described and defined in the claims.

The invention is illustrated in the accompanying drawings, wherein like characters indicate like parts throughout the several views.

Referring to the drawings, Figure 1 is a view partly in elevation and partly in section showing one of my improved nut locks applied to lock the nut on a bolt. Fig. 2 is a plan view of the nut lock shown in Fig. 1 removed from working position and Fig. 3 is a section taken through the nut lock on the line $x^3$ $x^3$ of Fig. 2.

The numeral 1 indicates a bolt, on the threaded end of which is a nut 2. As shown, the bolt 1 is passed through a pair of bars 3, and a washer 4 is interposed between the nut 2 and one of said bars.

What I believe to be the best form of the nut lock is illustrated in Figs. 1 to 3 inclusive, wherein the numeral 5 indicates a flat plate having tapered end portions that are bent over or folded inward to form spring prongs 6. The said springs, at their opposing ends, are formed with segmental threads 7 that are adapted to be screwed onto the threaded end of the bolt 1, under considerable friction. At the center of the plate 5 is a large passage 8 through which the threaded end of the bolt is adapted to pass without engagement. By reference to Figs. 1, 2 and 3 it will be seen that the segmental threads 7 project inward of the walls of the passage 8. Said threads 7 may be tapered slightly toward the passage 8, so as to assist in applying the nut lock to the threaded end of the bolt. Preferably, the free threaded ends of the spring arms 6 are upset or thickened to increase the number of threads that may be cut thereon. The nut lock, as will be seen by reference to Fig. 2, is rectangular in plan view, so that it may be turned onto the bolt and tightly pressed against the nut by means of a wrench. When the nut lock is applied as shown in Fig. 1, and the same is tightly forced against the nut, the spring arms are pressed more closely to the body of the said lock, and since the said arms 6 are normally extended at an angle to the said body, it is evident that the closer they are forced to the said body portion, the more tightly they will be pressed against the threads of the bolt. It is also evident that any outward or unscrewing movement of the nut will tend to force still more closely together the body and prong portions of the nut lock, and thereby still more tightly press the threaded ends of the spring arms into contact with the threads of the bolt.

The improved nut lock above described may be constructed at very small cost; it may be very quickly and easily applied in working position on a bolt by means of a wrench; and when applied it will securely hold a nut and will not jar or rattle loose. The said nut lock is, therefore, adapted for a great many uses, and especially for use on cars and on rail joints where nuts and bolts are subjected to many jars and strains tending to loosen the nuts. If desired, the device may be cast of malleable iron.

The nut lock, so-called, in one sense prevents rotation of the bolt with respect to the nut and, hence, might also be designated as a bolt lock, but it will, of course, be understood that the term "nut lock" is herein used in a broad sense.

What I claim is:

A nut lock in the form of a plate or body having a central perforation of a size sufficient to freely pass the threaded end of a bolt or rod, and having opposing spring prongs extending inward at an angle to each other, and extending upward at their inner ends, the said inner ends of said prongs being thicker than the body of the plate and threaded for engagement with the threaded end of a bolt or rod, substantially as described.

In testimony whereof I affix my signature in presence of two witnesses.

EDWARD POSSON.

Witnesses:
     H. L. LINTON,
     O. J. SCHUMACHER.